United States Patent Office 3,544,224
Patented Dec. 1, 1970

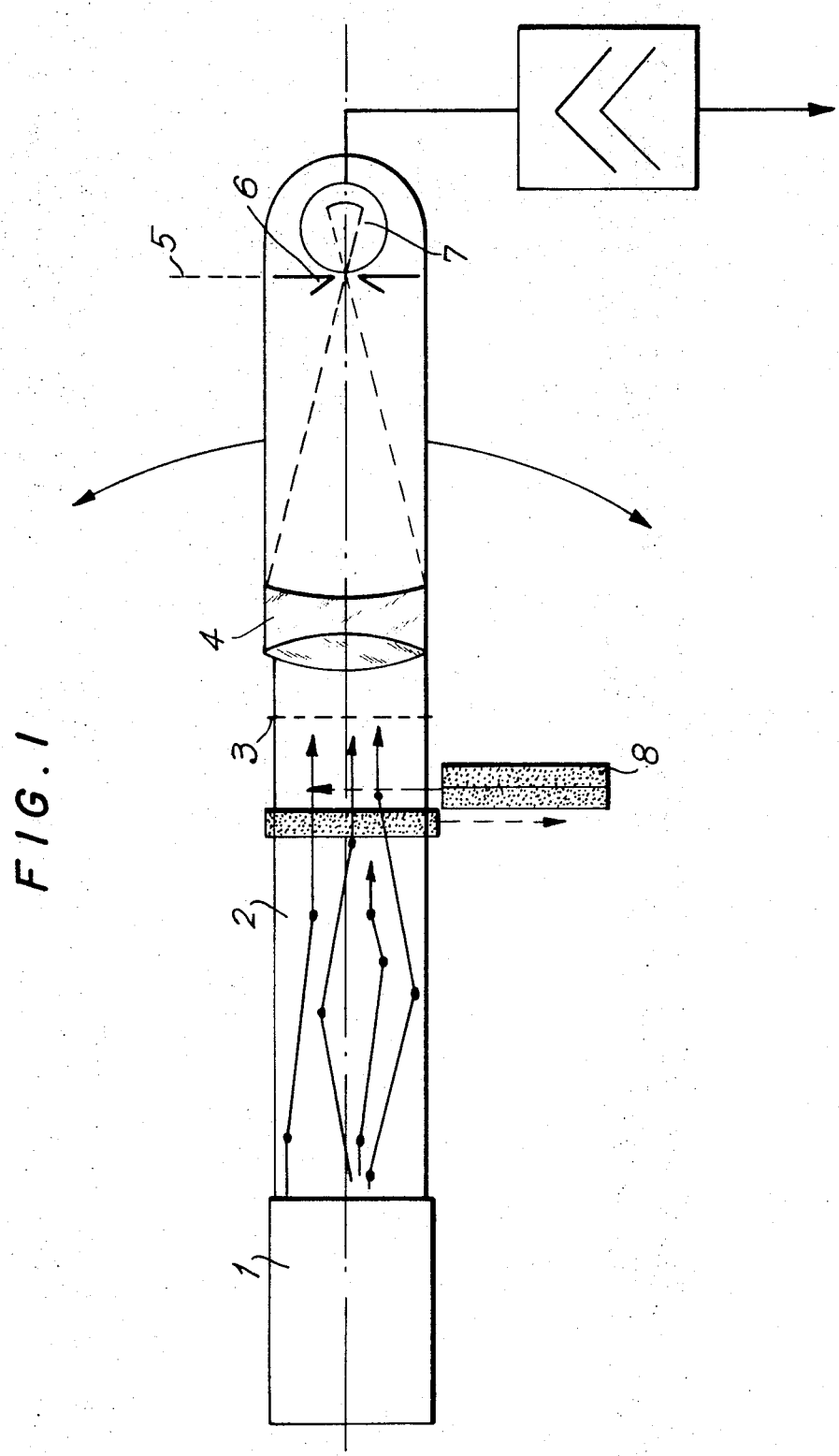

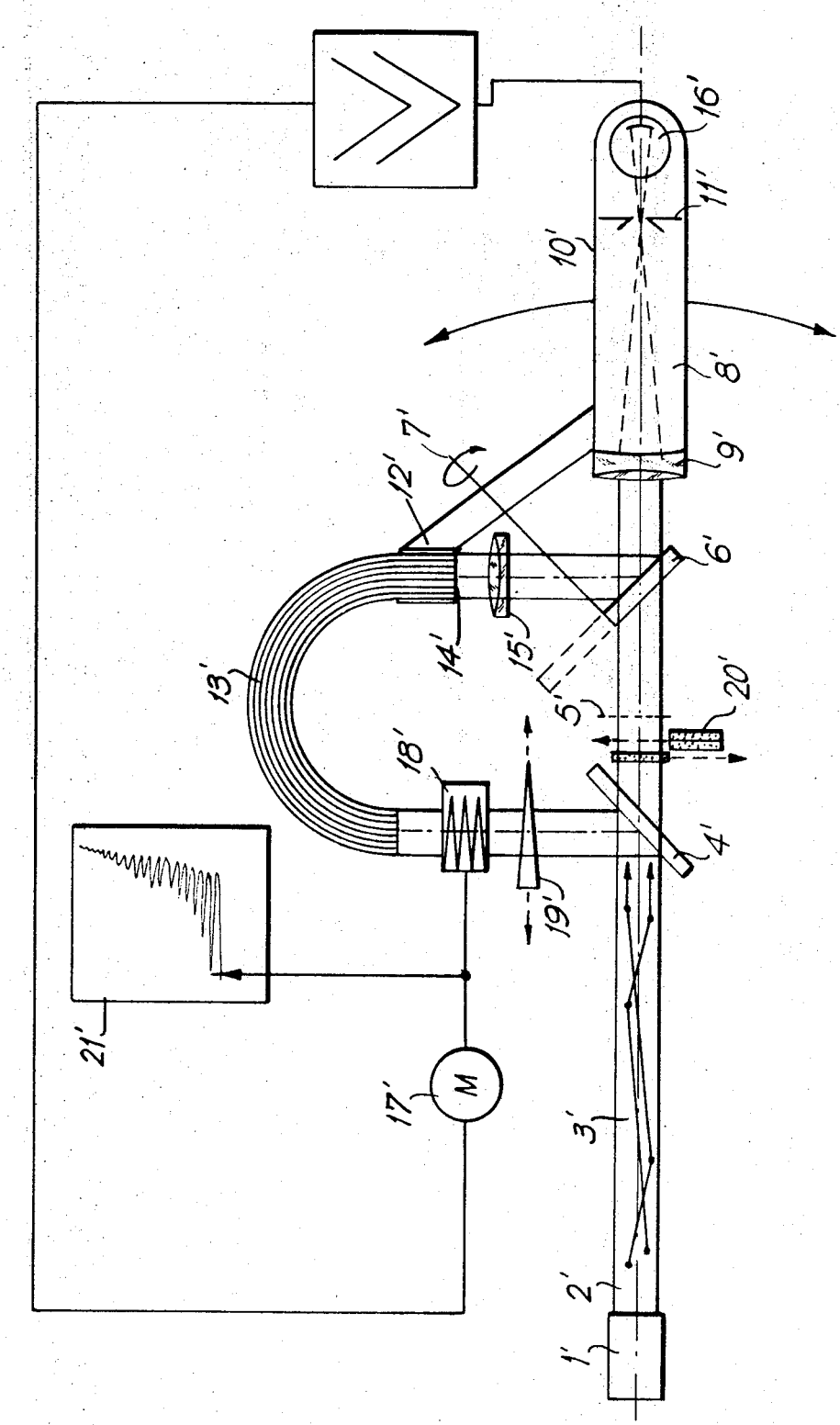

3,544,224
**METHOD FOR MEASURING THE OPTICAL TRANS-
MISSION CHARACTERISTICS OF TRANSPARENT
AND TRANSLUCENT MEDIA AND OPTICAL
DIFFRACTOMETER FOR CARRYING OUT THIS
METHOD**
Wolfgang Friedl, Neckargemund, Germany, assignor to
Eltro GmbH & Co., Heidelberg, Germany
Filed Aug. 14, 1967, Ser. No. 660,327
Claims priority, application Germany, Aug. 25, 1966,
E 32,366
Int. Cl. G01n 21/06, 21/22, 21/26
U.S. Cl. 356—201
10 Claims

ABSTRACT OF THE DISCLOSURE

A method and apparatus is provided for measuring the angle dependency of the intensity of a monochromatic spectrum produced by penetration through a transparent or translucent medium, the invention being characterized in that the beam of rays issuing from the medium is subdivided through a diffraction grating and the diffraction angle is continuously detected by means of a telescope rotatable about an axis intersecting optical axis of the system at right angles and lying in the plane of the grating, the rays thereby received being supplied to a receiver diode and converted therein into electrical signals which can be displayed in the form of a curve, consisting of adjacent loops wherein the maximum of one loop represents the intensity associated with the corresponding angle.

BRIEF DESCRIPTION OF THE DRAWING

FIG. 1 diagrammatically illustrates one embodiment of the invention; and

FIG. 2 diagrammatically illustrates a second embodiment of the invention.

DETAILED DESCRIPTION

This invention relates to methods for measuring transmission characteristics of transparent and translucent media, and more particularly to measuring the transmission characteristics of the atmosphere, and the invention furthermore relates to optical diffractometers for carrying out this method.

A feature of this invention is that the diffusion is measured and evaluated separately from the absorption by measuring the angle of dependence of the continuous monochromatic diffraction spectrum.

According to another feature of the invention, both the calibration of the diffraction angles and of the associated intensities is effected by using a unidimensional periodic amplitude and/or phase structure (e.g., a ruled grating) traversed by a beam.

The basic principle of the method according to the invention consists in that a coherent beam, emitted from a suitable radiation source, enters the measuring instrument more or less incoherently, due to the statistical, space- or time-variations in the density of the respective medium, for example, by fluctuations of the air composition of an aerosol or the like, thus effecting a continuous background in the monochromatic "spectrum" of a diffraction grating.

The angle dependence of the instantaneous intensity of the continuous background represents the noise spectrum/power spectrum of the medium. This continuous spectrum appears particularly when optically active particles are present in the medium with a statistical frequency distribution regarding their size and form and an aleatoric position distribution. In certain media, the position of the particles can also be subject to time variations, so that there is then a space- and a time-noise. Both effects can be examined, isolated from each other, by either varying the diffraction angle and integrating for the individual diffraction angles over a sufficiently long time interval, or by keeping the diffraction angle constant and measuring for any diffraction angle the time dependence of the intensity and determining therefrom the respective Wiener spectrum for the associated auto-correlation function.

In addition, by simultaneous measurement with two diffractometers, which are generally set to two different but constant diffraction angles, there can be determined the cross correlation function for both diffraction angles.

Principally, it is necessary to distinguish between blurring (for example, of the point image function), and the statistical space- or time-variations proper. Blurring means that the point image functions of a diffraction-limited image-forming optical system, for example, is widened by the interposition of the medium. The blurring has practically no effect on the relative intensities of the individual grating orders, if a diffraction grating is arranged in the path of rays behind the medium. However, if the grating is reproduced over the medium, the blurring varies the relative intensities of the grating orders.

For measuring the diffraction spectrum, that is, the angle dependence of the intensity, the optical diffractometer proper is used. It consists substantially of a telescope objective, in the focal plane or Fourier plane, in which is arranged a slit or another suitably formed diaphragm. This system objective diaphragm can rotate about an axis perpendicular to its optical axis. In a perpendicular plane passing through this axis of rotation can be arranged the unidimensional diffraction grating (ruled grating) whose grating lines are parallel to the axis of rotation. This grating serves both for the calibration of the diffraction angles and of the associated intensities. In a strictly coherent radiation of the grating, its monochromatic diffraction spectrum is characterized by narrow intensity maxima (for example, lines in the case of a slit) the relation $m\lambda = g(\sin \Phi + \sin \psi)$ (1) being considered as a necessary addition for the appearance of the intensity maxima, where $m$ denotes the lattice order, $\lambda$ the wavelength of the radiation, $\Phi$ the angle of incidence, and $\psi$ the diffraction angle.

The measurement of the angle dependence of the intensity is effected by photoelectric means, by arranging behind the diaphragm a suitable receiver, particularly a sensitive secondary electron multiplier whose photoelectric current is recorded by means of a recorder in dependence on the angle of rotation of the telescope. The system radiation-source-diffracting grating-telescope represents in principle a spectrometer.

In order to avoid time variations of the radiation source and/or of the photoelectric receiver, there can be used, for example, the principle of the double beam-alternating light method.

The advantages of the measuring method and/or measuring instrument suggested according to the invention, in general, and particularly with respect to the known methods and instruments, which are used, for example for determining the so-called visual range are the following:

(1) Due to the invariance of the diffraction structure in the Fourier plane (Fraunhofer diffraction) with respect to a translation of the diffracting structure or grating in the grating plane and a considerable invariance both with respect to minor rotations, practically no precision-mechanical aids are necessary for the adjustment. This insures necessarily also the in sensitivity of the respective instrument part to vibrations, shock and impact.

(2) A suitable diffraction grating with a grating constant $g$ of the order of $100\mu$ yields according to Equation 1 a plurality of discrete intensity maxima which are practically equidistantly distributed over the entire relatively small) angular range of about ±15 deg. which is of interest for the measurement. Since these intensity maxima represent to a great extent invariant calibration marks for the angles, separate and different precision measurements of the diffraction angles and special measures for synchronizing the rotation of the telescope with the paper feed of the recorder are unnecessary. Any possible time variations of the feeding velocity can therefore hardly have a misleading effect on the measuring result.

(3) Since the relative intensities above the continuum (noise) are unequivocally determined in the various grating orders by the grating structure and are generally easy to calculate by a Fourier analysis, time variations of the radiation source and/or of the receiver can be recognized and eliminated at any time even without the use of a double-beam-alternating light method, which sometimes results in a considerable increase in the cost of the measuring instrument.

(4) The diffractometer provides a function, namely the noise spectrum (power spectrum) for example, of the measured atmospheric layer and thus a more differentiated and more comprehensive description of the atmospheric transmission characteristics than, for example, the visual range indicated by a visibility meter, which is characterized by a single numerical value.

(5) In case there is both diffusion and absorption in the medium to be tested, the measuring result is not disturbed, because of the standard specification, since the influence of the absorption of the latter is eliminated. Most other instruments cannot evaluate the diffusion and absorption independent of each other.

(6) The diffractometer permits to examination of the time dependence of the diffusion-phenomenon separate from the time-dependent factors and in a very simple manner by setting the telescope to any selected diffraction angle $\psi$, which appears then as a parameter. This permits a more differentiated analysis of the processes in the medium to be tested than with instruments which do not provide the dependence of the angle (diffraction angle), since the time variations are generally also angle dependent.

(7) By combining two diffractometers which are set to two different but arbitrarily selectable $\psi_1$ and $\psi_2$ values, it is possible in the simultaneous operation of the instruments to derive the cross correlation function from the time-dependence of the measured intensities, which is associated with a pair of angles $\psi_1$, $\psi_2$. The cross correlation functions yield extended data about the properties of the medium tested.

An optical diffractometer for carrying out the method according to the invention is characterized in that the measurement of the angle dependence of the intensity of the monochromatic spectrum is effected by means of a telescope which turns about an axis which intersects the optical axis of the system perpendicularly and which extends in the plane of the diffraction grating. In order to evaluate the transmission characteristics of great atmospheric layer thickness, a continuous wave laser, for example, a gas laser, can be used as a monochromatic coherent radiation source. For the measurements of the wavelength-dependence of the transmission characteristics can be used a practically punctiform radiation source, for example, a xenon radiator with a collimator where the effective wavelength can be varied by means of a suitable monochromatic filter. The standardization of the measured relative intensities of the spectrum can be achieved automatically by means of a reference path of rays. A suitable flexible glass fiber optical system can be used to couple the reference path of rays with the rotary telescope.

Other details of the method according to the invention, as well as the diffractometer necessary for carrying out this method, can be seen from the following description of the embodiments represented schematically in the drawing.

In the drawing FIG. 1 shows the diagram of a simple optical diffractometer for measuring atmospheric transmission characteristics (transmission data).

A continuous wave laser 1 (e.g., a He/Ne gas laser) emits a monochromatic greatly coherent beam in the direction of the diffractometer proper. On its way to the diffractometer through the atmospheric layer 2 to be evaluated, the practically planar wave emitted by the laser is disturbed, for example, by the density variations of the atmosphere or by single- or multi-diffusion, for example, on mist drops. The density variations cause time- and space-variations of the index of refraction and can have the result that the optical path length $\int n(s)ds$ ($n$: index of refraction, $s$: position coordinate) of different rays is of different size, even with equal geometric length of the path. Multiple diffusions on any suspended particles can have the effect, for example, that a ray which has before and after the multiple diffusion the same direction of propagation, has actually covered no longer path than another ray with the direction of propagation. These two effects have the result that a coherent radiation entering the medium to be measured is more or less incoherent when leaving the medium. Apart from these possible processes, the rays penetrating the medium may have undergone a change of direction during the issuance from the medium both by the position- and time-dependent index of refraction $n$ and also by diffusion processes.

If the rays, on their way through the atmosphere, strike a diffraction grating 3, the dependence of the intensity on the diffraction angle will differ from that which the same diffraction grating would supply with coherent radiation. While a coherent radiation of the grating, apart from the generally very weak continuous background caused by the grating structure itself, results merely in a more discrete grating spectrum (one sharp intensity maximum in the individual grating arrangements), continuum is superposed on it when the radiation traverses a non-homogeneous particularly time-variable medium, which depends substantially on the specific properties of the irradiated medium and therefore characterizes and evaluates it.

As a diffraction grating there is used a transmission grating, namely either an amplitude grating or a phase grating for intensity reasons for example. The grating constant $g$ can assume values between about 0.1 and 1 mm.

The cross-section of the laser beam can be adapted, for example, by a focal system to the entrance pupil of the telescope. The diameter of the entrance pupil can vary between 20 and 200 mm., the focal length of the telescope objective 4 between about 150 and 1000 mm. The lineal dimension of the diaphragm 6 arranged in the focal plane 5 of the telescope objective would then have to be about 15 to 100$\mu$.

The signal of the secondary electron multiplier 7, which is so arranged behind the diaphragm that it is radiated on substantially homogeneously, is recorded by a recording device, while the telescope turns about the axis extending in the plane of the diffraction grating perpendicularly to the optical axis. The entire angular range of the telescope must be about 30 deg. (±15 deg.) in order to be able to cover the substantial position frequency range of atmospheric noise. In this angular range the intensity varies under certain circumstances by several orders of magnitude. This should be taken into account as far as possible by arranging suitable discrete grey filters 8 in the path of the rays, so that the secondary electron multiplier is protected against over-radiations. If the recorder just covers one decimal power, a grey filter with a transparency of 10% could be attached when the full deflection is achieved and vice versa.

FIG. 2 shows the principal diagram of a laser diffractometer according to the double-beam alternating light method.

The fundamental position of operation of this instrument is the same as that represented in FIG. 1. It differs from the latter only in that time variations of the intensity of the radiation source, and particularly of the receiver sensitivity, are compensated by means of a reference path of rays according to the principles of the double-beam alternating light method. To this end a reference signal is transmitted to the diaphragm 11' by means of a partly permeable mirror 4', which is arranged ahead of the diffraction grating 5' via a flexible fiber optical system 13' and a rotary sector mirror 6' through the telescope objective 9'. By means of a neutral wedge 19' in the reference path of rays, the latter is set for equal intensity with the maximum in the 0th grating order (standardization: 100% value). During the recording, the compensation is then effected automatically since, with unequal intensities in the two paths of rays the secondary electron multipliers transmit an A-C signal at the modulator-frequency velocity of the sector mirror, which controls a servo-motor 17' which compensates the intensities by means of a comb diaphragm 18'. The position of the comb diaphragm in the reference beam is then a measure for the relative intensity of the associated diffraction angle and is recorded by a suitable recording device 21'. The recording device 21' displays the electrical signals in receiver 16' in the form of a curve consisting of adjacent loops wherein the maximum of one loop represents the intensity associated with the corresponding angle.

The end face 14' of the fiber optical system from which the rays transmitted by the glass fibers issue, is rigidly connected by a holder 12' with the pivot 7' of the sector mirror, the telescope 8' and the objective 15', so that the focussing of the reference beam on the diaphragm 11' of the telescope is insured for any angular position.

What is claimed is:

1. An optical diffractometer system having an optical axis and comprising a monochormatic coherent radiation source for projecting light along said axis through a sample medium having determinable optical transmission characteristics which are to be measured, and means for measuring the angle dependence of the intensity of the monochromatic spectrum of said radiation when the latter has traversed said medium, said means for measuring including a diffraction grating positioned on said axis to intercept the light after it has passed through said medium, a telescope which is rotatable through different angles about an axis which intersects the optical axis of the system perpendicularly and which extends in the plane of the diffraction grating, and means for measuring the light transmitted through said telescope from said diffraction gating, and indicator means for indicating the output of the measuring means in the form of a curve consisting of adjacent loops wherein the maximum of one loop represents the intensity associated with the corresponding angle.

2. A method of measuring the angle dependence of the intensity of a monochromatic spectrum produced by penetration through a transparent or translucent medium, said method comprising projecting a beam of coherent monochromatic light through said medium, dividing the beam of rays transmitted through the medium through a diffraction grating to produce a plurality of divided beams, measuring the light transmitted through the diffraction grating by continuously scanning said light at different angles about an axis intersecting the optical axis of the system at right angles and lying in the plane of the grating to produce electrical signals indicative of the light intensity of said plurality of divided beams as a function of corresponding angles of measurement, and displaying the signals in the form of a curve consisting of adjacent loops wherein the maximum of one loop represents the intensity associated with the corresponding angle.

3. A method according to claim 2 comprising calibrating the diffraction angles and associated intensities by traversing a unidimensional periodic structure by a light beam.

4. A system according to claim 1, wherein said monochromatic coherent radiation source comprises a continuous wave laser.

5. A system according to claim 1, wherein said source comprises a substantially punctiform radiation source including a collimator, said system further comprising monochromatic filters, positioned along said optical axis.

6. A system according to claim 1 comprising means directing light in a reference path for measured relative intensities of the spectrum.

7. A system according to claim 6, wherein said means directing light includes a glass fiber optical means to couple the reference path with the telescope.

8. A system according to claim 1 comprising means for measuring time variations of the intensity for any selected but constant diffraction angle and means for evaluating the time variations of the intensity.

9. A system according to claim 8, wherein said means for evaluating comprises means to perform an auto-correlation function.

10. A system according to claim 8 comprising means coupling said means for evaluating of two systems to effect a cross-correlation function.

References Cited

UNITED STATES PATENTS

| | | | |
|---|---|---|---|
| 3,005,098 | 10/1961 | Buschman et al. | 250—51.5 |
| 3,013,466 | 12/1961 | Kaye | 356—104 |
| 3,105,902 | 10/1963 | Ostrofsky et al. | 356—98 X |
| 3,153,144 | 10/1964 | Neuhaus | 250—51.5 |
| 3,163,754 | 12/1964 | Bigelow | 250—51.5 |
| 3,198,944 | 8/1965 | Furbee | 250—51.5 |
| 3,200,247 | 8/1965 | Sahores | 250—51.5 X |
| 3,358,148 | 12/1967 | Conklin et al. | 356—104 |
| 3,363,505 | 1/1968 | Stone | 356—186 X |
| 3,420,609 | 1/1969 | Kozawa | 250—218 X |
| 3,424,428 | 1/1969 | Conon | 250—51.5 |

FOREIGN PATENTS

| | | |
|---|---|---|
| 285,521 | 1/1953 | Switzerland. |
| 1,374,654 | 8/1964 | France. |

RONALD L. WIBERT, Primary Examiner

W. A. SKLAR, Assistant Examiner

U.S. Cl. X.R.

250—51.5; 350—162; 356—71, 204, 205, 208,